United States Patent [19]
Nagata

[11] Patent Number: 5,452,370
[45] Date of Patent: Sep. 19, 1995

[54] IMAGE PROCESSING APPARATUS
[75] Inventor: Yasuyuki Nagata, Saitama, Japan
[73] Assignee: Sony Corporation, Tokyo, Japan
[21] Appl. No.: 163,404
[22] Filed: Dec. 7, 1993

Related U.S. Application Data

[63] Continuation of Ser. No. 883,772, May 15, 1992, abandoned.

[30] Foreign Application Priority Data

May 20, 1991 [JP] Japan .................... 3-142749

[51] Int. Cl.$^6$ .............................................. G06K 9/00
[52] U.S. Cl. ....................................... 382/153; 348/95; 382/254; 364/559; 364/478
[58] Field of Search ....................... 382/8, 54, 41.1; 364/478, 559; 348/86, 92, 126, 95

[56] References Cited

U.S. PATENT DOCUMENTS

| | | | |
|---|---|---|---|
| 4,803,735 | 2/1989 | Nishida et al. | 382/8 |
| 4,821,336 | 4/1989 | Roye | 382/54 |
| 4,975,972 | 12/1990 | Bose et al. | 382/8 |
| 4,985,846 | 1/1991 | Fallon | 382/8 |
| 5,048,096 | 9/1991 | Beato | 382/54 |

OTHER PUBLICATIONS

Gleason et al, "A Vision Controlled Industrial Robot System", 10/81, pp. 381–388, IAS 1981 Annual Meeting.

Primary Examiner—David K. Moore
Assistant Examiner—David B. Anderson
Attorney, Agent, or Firm—Jay H. Maioli

[57] ABSTRACT

An image processing apparatus calculates a feature of an object for recognition with a high degree of accuracy. Image information taken by a camera attached to a robot is first digitized and then stored into an image memory. A program in a robot program storage section includes instructions for operation of the robot and an instruction requesting an image processing CPU to extract a feature for recognition of an object being worked upon (e.g., a ring with a projection). In response to an instruction from a robot instruction analyzing and executing section, the image processing CPU determines a removal range for image information in the image memory, extracts a feature (e.g., a projection) of the object for recognition (e.g., a ring with a projection), executes a calculation regarding the feature (e.g., a moment calculation and so forth) and delivers a result of the calculation to the robot instruction analyzing and executing section. The robot grasps the object in accordance with the result of the calculation received.

6 Claims, 18 Drawing Sheets

FIG. 15

| CASE \ IMAGE | (1) | (2) | (3) | (4) | (5) |
|---|---|---|---|---|---|
| RUN INFORMATION | L1, E1 | L2, E2 | L3, E3 | L4, E4 | L5, E5 |
| REMOVAL INFORMATION | MF1, MR1, M1 (DIVISION) | | | M4 | M5 |
| RESULT OF PROCESSING | | (ALL REMOVAL) | L3 (MAINTAINED) | (FIRST REDUCTION) | (SECOND REDUCTION) |

⊖— FIRST END OF RUN
⊤ LAST END OF RUN

FIG. 16
(i) DIVISION
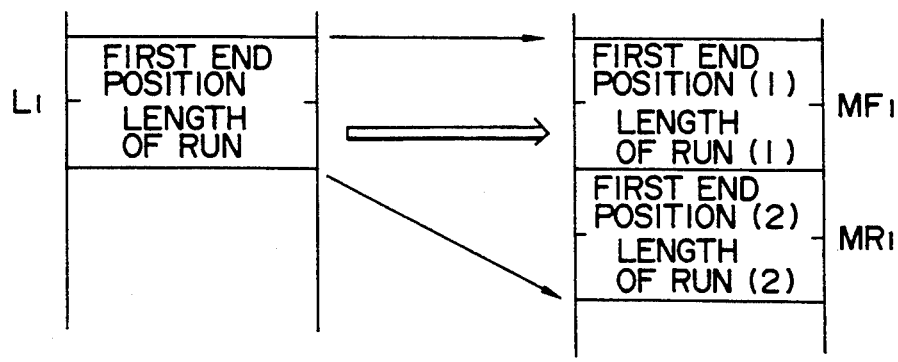
(ii) ALL REMOVAL
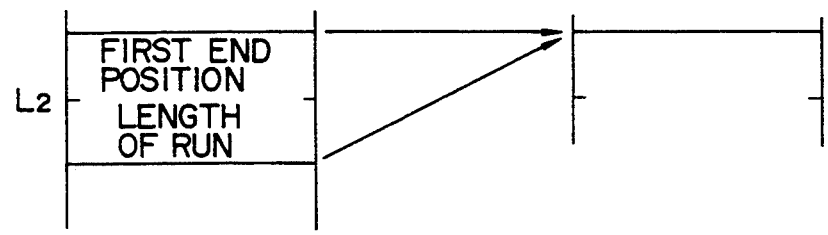
(iii) FIRST REDUCTION
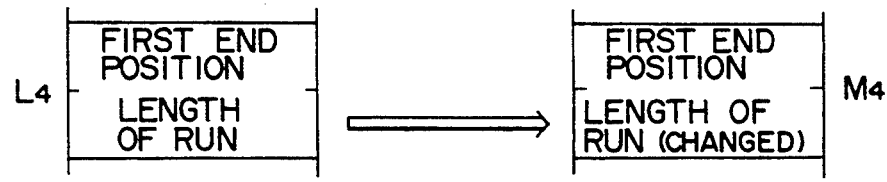
(iv) SECOND REDUCTION
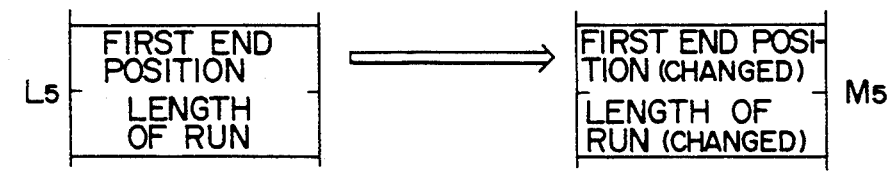

F I G. 24
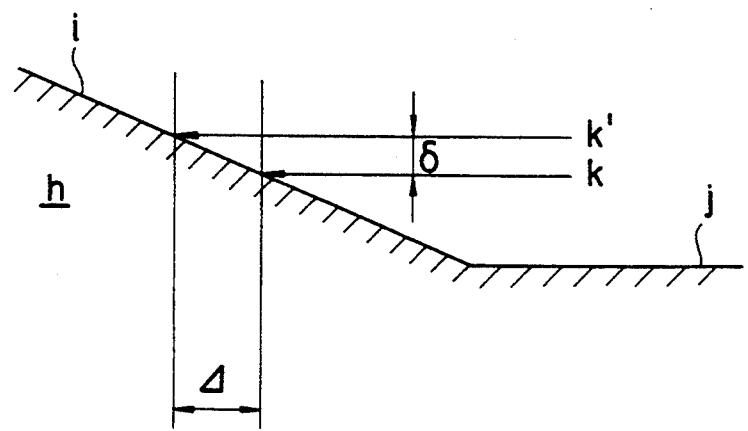

IMAGE PROCESSING APPARATUS

This is a continuation of application Ser. No. 07/883,772 filed May 15, 1992 now abandoned.

BACKGROUND OF THE INVENTION

1. Field of the Invention

This invention relates to a novel image processing apparatus wherein an image obtained from imaging means is pre-processed so that features of an object which has a profile having features which cannot be grasped readily only by calculation of the center of gravity such as, for example, a head drum for a video tape recorder can be extracted readily.

2. Description of the Related Art

Conventionally, most of image processing apparatus for an industrial robot are constructed so that an instruction can be delivered from a robot program to the image processing apparatus and extraction of features such as measurement of a perimeter, measurement of a superficial content, detection of the center of gravity, calculation of a moment and so forth of an object for recognition can be performed under one command and so that results of processing of the image processing apparatus can be utilized readily.

Referring to FIGS. 18 to 21, there is shown a recognizing process of a part handled on an assembly line for electronic appliances. An area indicated by cross hatching in a picture frame F of a photographed image I represents an object for recognition while a white ground represents the background.

A part a has a profile wherein a portion c of a ring portion b projects radially outwardly as seen in FIGS. 18 to 21, and recognition of such projection is conventionally executed in the following procedure.

(1) First, the center O of an inner circle of the ring portion b of the part a is detected using a gravity center detecting function (refer to FIG. 19).

(2) A circular path d (indicated by an alternate long and two short dashes line in FIG. 20) of a suitable radius r centered at the detected center O of gravity is determined.

(3) The circular path d thus determined is traced in the direction indicated by a broken line arrow mark A, whereupon the projection c is recognized (refer to FIG. 21).

The method described above, however, has problems as described below.

(1) Since the tracing method centered at the center of gravity is liable to be influenced by noise, if dots e originating from noise are present in the proximity of the projection c as shown in FIG. 22, then they may be mistaken as portions of the projection. Noise removing processing is required in order to prevent such a detection error, and a large amount of calculation such as a filtering process is necessary, which works against the requirement for enhancement in speed of a calculating process.

(2) Stains such as f sticking to a surface of a part as shown in FIG. 23 may have an influence upon the accuracy in detection, or a portion g which must originally be detected as part of a projection may shine white due to illumination so that it may be regarded as the background, resulting in continuation of tracing of the circular path. In either instance, a loss of information occurs disadvantageously.

Further, when an edge portion i of a projection h inclined slightly with respect to another portion j contiguous therewith as shown in FIG. 24, the tracing direction does not coincide with the direction of a normal to the edge portion i of the projection h, and consequently, a small difference $\delta$ in diameter between different trace circles k and k' will appear as a large error $\Delta$ in detected position of the projection h.

(3) In a condition wherein the problem described just above occurs, a calculation may be formed wherein low frequency components of spatial frequencies of an image are processed by moment calculation (calculation wherein squares of distances from a reference point are multiplied by an amount corresponding to a density at a minute piece and then all of such products are added) in order to avoid the problem.

If moment calculation is performed for the image of the part shown in FIG. 18, then the center of gravity of the part a will be positioned in the proximity of the center O of the inner circle as shown in FIG. 25(a), and if a portion around the center O is shown in an enlarged scale, then the center of gravity must originally be positioned, as indicated by a point G of FIG. 25(b), on a half-line L which extends from the center O of the inner circle of the ring portion b passing a central portion of the projection c.

However, because of an error in detection of the ring portion b, the center of gravity is sometimes displaced from the line L, for example to a point G' or G''. Since such an error in the proximity of the center O appears as a greater displacement from the direction of the half-line L as the distance from the center O increases as seen from the broken lines, it is difficult to detect the direction of the projection c with a high degree of accuracy.

In summary, images which cannot be recognized readily by the conventional method include an image which has a uniform portion centered at the center of gravity, an image which includes a block at a position other than a position at which a feature is to be extracted and spaced away from the center of gravity, and so forth. In other words, images wherein a position which is understood as the center of a part and a position of the center of gravity of the part are near each other are difficult to recognize.

By the way, almost all of common assembly processes involve the former, that is, images which have a uniform portion at the center of gravity. Accordingly, if images which have a uniform portion around the center of gravity can be removed by any method from photographed images, then the latter, that is, images which include a block at a position spaced away from the center of gravity, can be recognized readily.

SUMMARY OF THE INVENTION

It is an object of the present invention to provide an image processing apparatus which can calculate a feature amount of an object for recognition with a high degree of accuracy.

In order to attain the object, according to an aspect of the present invention, there is provided an image processing apparatus, which comprises imaging means for taking an image of an object for processing, image removing means operable in response to an instruction for removing, from image data received from the imaging means, those data which correspond to a predetermined area at a designated position, and processing means for processing the data received from the image removing means to effect recognition or measurement of the object for processing. Image complement means operable in response to an instruction for complementing image data received from the imaging means so that it may considered that the object for processing is detected in a predetermined area at a designated position may be provided in place of or in addition to the image removing means.

According to another aspect of the present invention, there is provided an image processing apparatus, which comprises imaging means for taking an image of an object for processing, memory means for storing therein data of the image of the object for processing from the imaging means, image removing means operable in response to an instruction for clearing the image data at that portion of the memory means which corresponds to a predetermined area at a designated position to remove part of the image information, and processing means for processing the data received from the memory means to effect recognition or measurement of the object for processing. Image complementing means operable in response to an instruction for setting the image data at that portion of the memory means which corresponds to a predetermined area at a designated position to complement the image information for an information dropping portion may be provided in place of or in addition to the image removing means.

According to a further aspect of the present invention, there is provided an image processing apparatus, which comprises imaging means for taking an image of an object for processing, binary digitizing means for binary digitizing data of the image of the object for processing from the imaging means, run length coding means for run length coding the image data from the binary digitizing means, run length code storage means for storing therein run length codes from the run length coding means, reducing means operable in response to an instruction for removing or reducing those of the run length codes from the run length code storage means which are within a predetermined area such that only those of the run length codes which are outside the predetermined area may remain, and processing means for processing the data received from the reducing means to effect recognition or measurement of the object for processing.

According to a still further aspect of the present invention, there is provided an image processing apparatus, which comprises imaging means for taking an image of an object for processing, binary digitizing means for binary digitizing data of the image of the object for processing from the imaging means, run length coding means for run length coding the image data from the binary digitizing means, run length code storage means for storing therein run length codes from the run length coding means, complementing means operable in response to an instruction for additionally storing a run length code representative of a predetermined area into the run length code storage means (which may be provided in place of or in addition to the reducing means), and processing means for processing the data received from the run length code storage means to effect recognition or measurement of the object for processing.

With the image processing apparatus, information of a certain range is removed from or complemented for image information of an object for recognizing or measuring processing. Thus, from an image of which extraction of a feature is conventionally difficult, an image portion which represents a feature of the image best can be extracted, and consequently, recognition of the object can be executed with a high degree of accuracy. Besides, such processing can be realized only if a programmer designates the processing as a statement. Accordingly, an existing programming environment can be maintained without modifying the existing robot program system very much.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 15 is a table illustrating different processes of "run information";

FIG. 16 is a diagrammatic representation illustrating processes for run length code information corresponding to the processes illustrated in FIG. 15;

FIG. 24 is a diagrammatic view illustrating an error in detected position by the conventional image processing method.

DETAILED DESCRIPTION OF THE PREFERRED EMBODIMENTS

A basic premise of the present invention is that, when an extracting process of a feature for recognition of an image is to be performed, that information which will obstruct extracting processing of a feature is removed in advance from image data which make an object for processing to achieve a high degree of accuracy in extracting processing.

It is to be noted that, in the relation between an image processing apparatus and a numerical controlling apparatus of a robot, such a removing operation as described above must be able to be performed in accordance with an instruction when a robot programmer describes operation of a robot. This can provide an environment wherein a robot programmer can program in an interactive condition with the image processing apparatus.

Before hardware construction of an image processing apparatus according to the present invention is described, an exemplary operation of a robot and an object for the operation will be described with reference to FIGS. 4 and 5.

Figure 4:
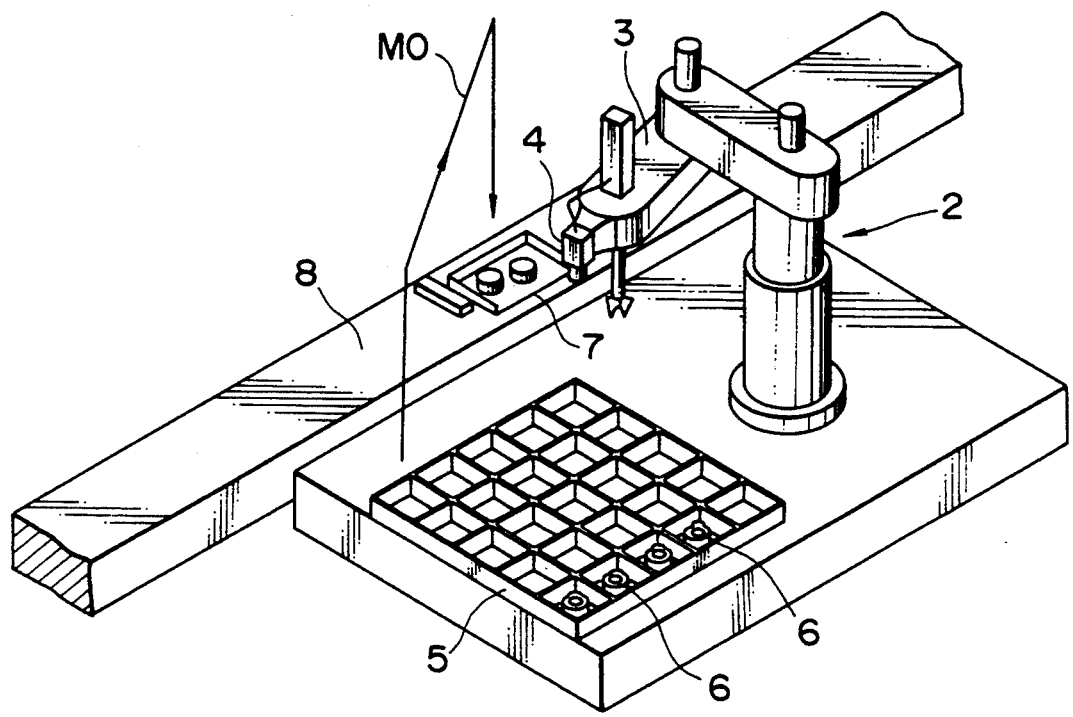
FIG. 4 is a perspective view showing an exemplary working operation of a robot.

Referring first to FIG. 4, a biaxial robot 2 of the scalar type includes a pair of arms and a camera 4 secured to an end of one 3 of the arms remote from a base axis portion thereof (the arm will be hereinafter referred to as second arm). The robot 2 executes recognizing processing of an image photographed by the camera 4, and in accordance with such recognizing processing, the robot 2 takes out a ring 6 with a projection from within a pallet 5 and assembles the ring 6 to a chassis 7 for a video tape recorder.

A transport path 8 is constituted from a conveyor which transports a chassis 7 for a video tape recorder. The chassis 7 for a video tape recorder is transported from another station not shown by the transport path 8 to the present stage, at which a ring 6 with a projection is assembled to the chassis 7 for a video tape recorder.

A plurality of rings 6 with a projection are disposed in advance in rows and columns in the pallet 5.

Figure 5:
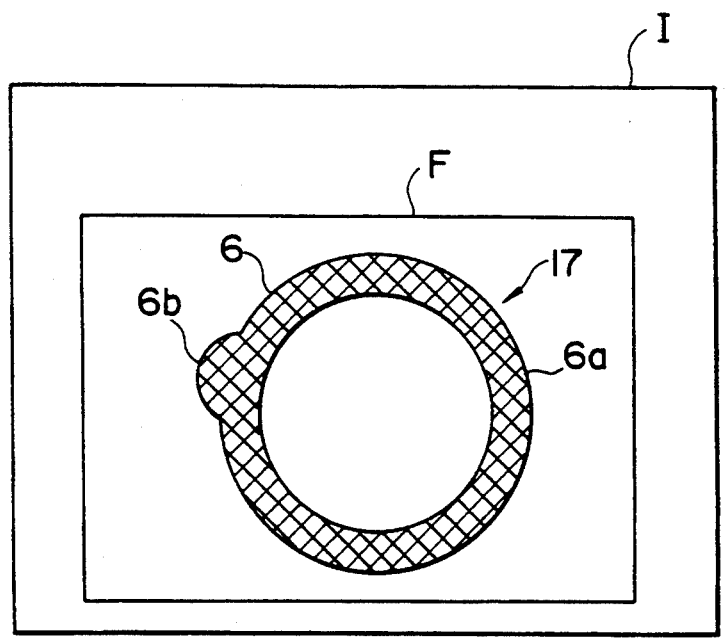
FIG. 5 is a schematic view illustrating an original image of a ring with a projection.

Referring now to FIG. 5, each of the rings 6 with a projection has such a profile that part 6b of an outer peripheral edge of a ring portion 6a thereof projects radially outwardly. It is to be noted that, in FIG. 5, a portion which looks dark in a picture frame F of a photographed image I is indicated by an area in which cross hatching is shown.

Referring to FIGS. 4 and 5, the robot 2 operates in accordance with an instruction from a numerical controlling apparatus therefor (not shown) and the camera 4 secured to the end of the second arm 3 thereof is provided to photograph the pallet 5 and so forth. An image photographed by the camera 4 is analyzed by an image processing apparatus according to the present invention.

The rings 6 with a projection disposed on the pallet 5 are normally different or at random in orientation and have the projections 6b thereof directed differently.

However, when a ring 6 with a projection is to be assembled to a chassis 7 for a video tape recorder, a direction of the projection 6b thereof must be recognized because a caulking position thereof must be grasped.

Thus, the robot 2 grasps a ring 6 with projection in accordance with a result of recognizing processing of an image photographed by the camera 4, moves the ring 6 along a locus MO of movement while correcting the orientation of the same and assembles the same to the chassis 7.

Figure 1:
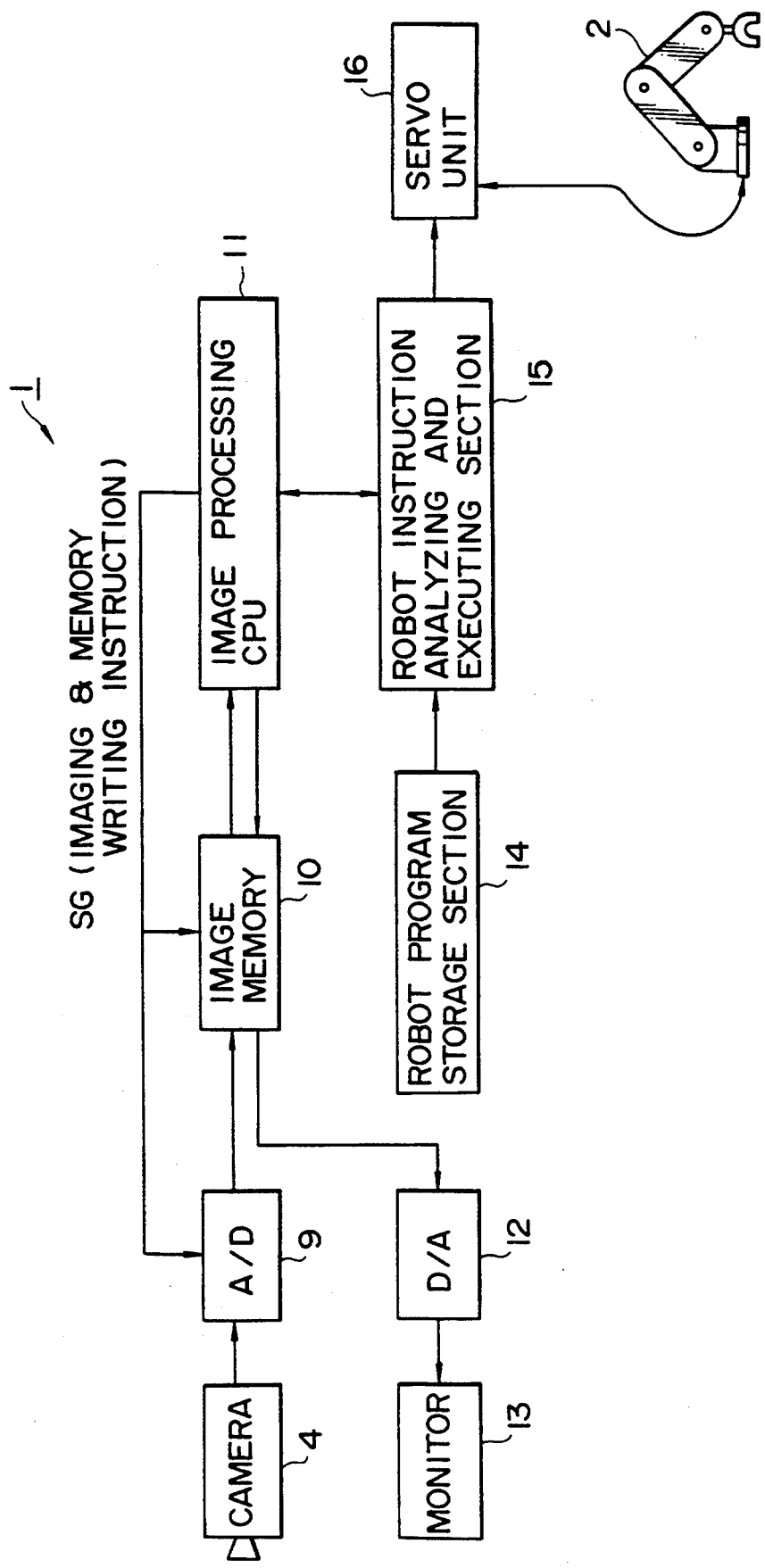
FIG. 1 is a block diagram of hardware construction of an image processing apparatus showing a first preferred embodiment of the present invention.
Figure 2:
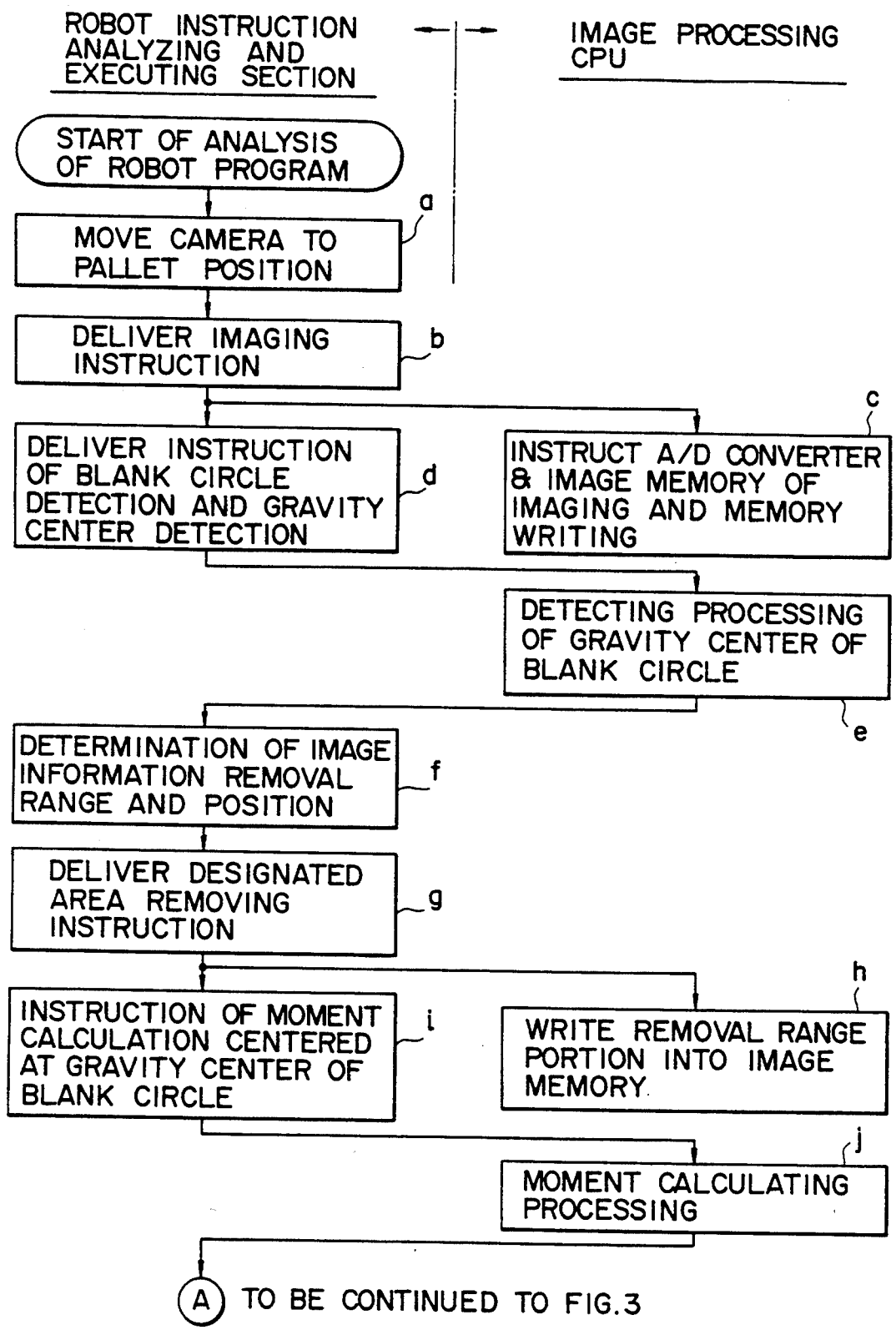
FIGS. 2 and 3 are flow charts illustrating a flow of image processing and controlling of a robot executed by the image processing apparatus of FIG. 1.

Referring now to FIG. 1, there is shown hardware construction of an image processing apparatus 1 according to a first preferred embodiment of the present invention and a robot controlling system.

In an assembling operation of a ring 6 with a projection to a chassis 7, the camera 4 first photographs one of the rings 6 with a projection disposed on the pallet 4 shown in FIG. 4 and outputs an image signal of the photographed ring 6 with a projection. It is to be noted that the location of the camera 4 is not limited to a movable portion of the robot 2 such as the second arm 3 described above but may be a fixed location with respect to a work area. However, since a coordinate system of the robot 2 must necessarily conform to a coordinate system of the image processing system 1, the location of the camera 4 should be determined taking this into consideration.

Further, the broadcasting system of the camera 4 may be of the type which outputs an NTSC signal which is used commonly or of the type which outputs a signal of any other specification such as, for example, SECAM or PAL. This is because a difference arising from a system can be coped with by writing control of image information into an image memory. However, preferably the broadcasting system employs a solid-state imaging device such as a CCD (charge coupled device). This is because a solid-state imaging device is low in distortion of an image comparing with other imaging devices and accordingly is suitable for such measurement of an image as described above.

An analog to digital (A/D) converter 9 converts an image signal from the camera 4 into a digital value of a suitable number of bits. Accordingly, not only a multibit converter but also a binary digitizing circuit can be used for the A/D converter 9.

An image memory 10 stores therein a digital image obtained from the A/D converter 9 and can be accessed arbitrarily from an image processing CPU (central processing unit) 11. Further, for the convenience of a programmer, stored contents of the image memory 10 are converted back into an image signal such as an NTSC signal by means of a digital to analog (D/A) converter 12 so that they can be visually confirmed on a monitor 13.

The image processing CPU 11 serving as the center of control can freely execute reading out from and writing into the image memory 10. However, upon accessing to the image memory 10, in order to prevent a possible disorder of the screen of the monitor 13, a so-called cycle steal method which allows accessing only for a vertical or horizontal blanking period should be employed.

Further, the image processing CPU 11 executes a calculation for detection of the center of gravity of an object for photographing and so forth and further executes a writing operation for masking processing using software which will be hereinafter described.

It is to be noted that the image processing CPU 11 can, when necessary, deliver an instruction SG to the A/D converter 9 and the image memory 10 to photograph and store a photographed image, respectively.

A robot program storage section 14 is provided to store therein a robot program which is programmed by an editor not shown. The robot program includes instructions for operation of the robot instructions for numerical calculation instructions to request the image processing CPU 11 for processing and so forth.

Statements constituting the program in the robot program storage memory 14 are successively read out and interpreted by a robot instruction analyzing and executing section 15. In accordance with a result of the interpretation, the robot instruction analyzing and executing section 15 outputs an instruction to a servo unit 16 in response to an instruction regarding operation of the robot, or receives an instruction regarding a numerical calculation and executes the instructed calculation by itself, or when it receives an instruction to request processing by the image processing CPU 11, the robot instruction analyzing and executing section 15 instructs the image processing CPU 11 regarding the processing and receives when necessary, a result of the processing.

It is to be noted that operation of the robot 2 is performed under the control of the servo unit 16.

A flow of image processing and robot control by the image processing apparatus of the first embodiment will be described with reference to FIGS. 2, 3 and 5 to 8. It is to be noted that since the robot 2 and the image processing apparatus 1 operate in a cooperating relationship with each other, in order to provide a clear indication of a corresponding relationship between operations of the two processing systems, processes regarding control of the robot 2, that is, processes by the robot instruction analyzing and executing section 15, are shown on the left-hand side half in FIG. 2 while processes regarding image processing, that is, processes by the image processing CPU11, are shown on the right-hand side half in FIG. 2.

Step a:

First (Step a), in order to photograph a ring 6 with a projection in a pallet 5 by means of the camera 4 provided on the second arm 3 of the robot 2, an end portion of the arm 3 of the robot 2 is moved to a predetermined position above the pallet 5.

Step b:

The robot instruction analyzing and executing section 15 delivers an instruction to the image processing CPU 11 to photograph a ring 6 with a projection, which constitutes an object for photographing, at the position of the camera 4 above the pallet 5.

Step c:

When the instruction to photograph a ring 6 with a projection is received from the robot instruction analyzing and executing section 15, the image processing CPU 11 delivers an instruction SG to the A/D converter 9 and the image memory 10 to store an image now taken by the camera 4. It is to be noted that the terminology "photographing" here is a synonym for storing into the image memory 10 and image processing is performed afterwards on information stored in the image memory 10. Processing by way of the image memory 10 minimizes a bad influence which may be caused momentarily by fine vibrations of the robot 2 upon an image photographed by the camera 4.

By the processing, an original image 17 of a ring 6 with a projection positioned in a picture frame F of image information I shown in FIG. 5 is stored into the image memory 10.

Step d:

Subsequently, the robot instruction analyzing and executing section 15 delivers, in order to find a position of an inner circle, that is, a "blank circle", of the ring 6 with a projection thus obtained, an instruction to the image processing CPU 11 to detect the center of gravity of the blank circle.

Step e:

The image processing CPU 11 thus receives the gravity center detecting instruction from the robot instruction analyzing and executing section 15 and calculates a position of the center of gravity of the inner circle of the ring portion 6a. It is to be noted that a suitable known technique may be used for the algorithm for calculation of the center of gravity then.

Since detection of the center of gravity is a calculating process of low frequency components in spatial frequencies of an image, a result of the calculation is stable and the center of gravity thus calculated can be utilized effectively as a feature point peculiar to the ring 6 with a projection. In other words, it can be said that the feature point is a more stable and certain point than any other point detected by feature extraction as an existing position of the ring 6 with a projection.

Step f:

A removal area of image information is determined in accordance with the position of the center of gravity detected at step e above.

While an area to be removed is stored in advance in the image processing CPU 11 by such a technique as teaching, in this case, such area to be removed is determined to be a circular area in advance. In particular, determination of a removal area of image information here signifies determination of coordinates of the center and a radius of a circle. More particularly, the coordinates of the center G of gravity detected at step e above are determined as the coordinates of the center of the circle as seen in FIG. 6, and as regards a dimension of the area of the circle to be removed, a suitable radius r including an outer circumference of the ring portion 6a is designated in advance by a teaching operation.

It is to be noted that, since the distance between the camera 4 and a ring 6 with a projection which is to make an object for photographing is fixed, the camera 4 will photograph any of the rings 6 with a projection on the pallet 5 in a same dimension unless a zoom lens is used to vary the magnification thereof. Accordingly, teaching for determination of the radius r must only be performed once upon programming of the robot program, and the value need not be varied after then.

Figure 6:
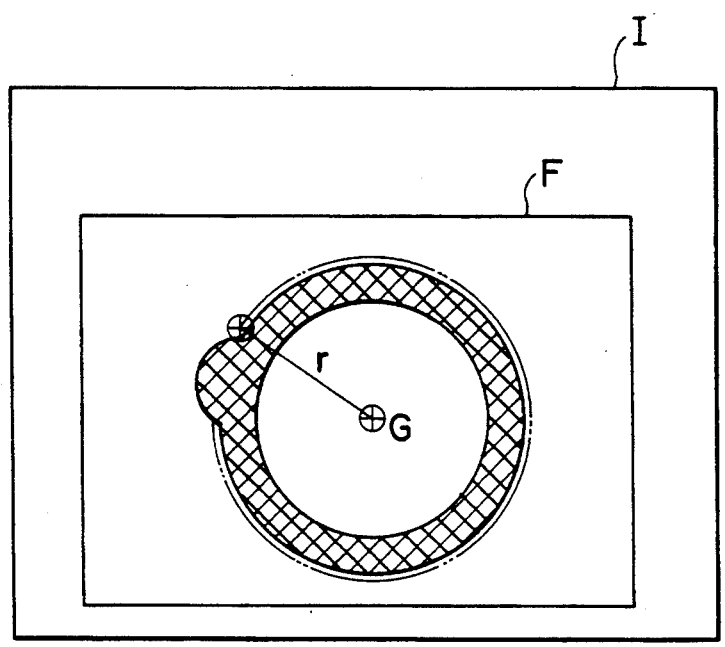
FIG. 6 is a schematic view illustrating designation of a removal range of image information.

Step g:

After the designated area (area of the circle delineated by an alternate long and two short dashes line in FIG. 6) is determined, the robot instruction analyzing and executing section 15 delivers a removing instruction to the image processing CPU 11 and notifies the image processing CPU 11 of the designated area.

Figure 7:
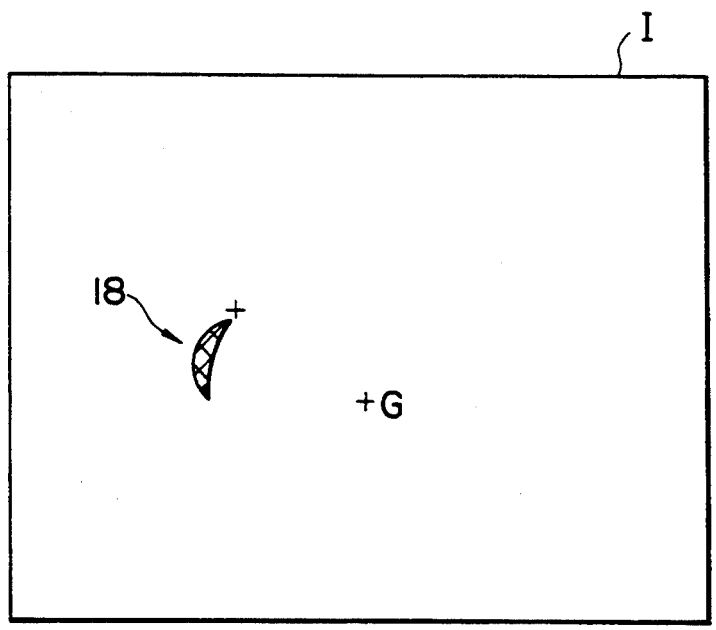
FIG. 7 is a schematic view showing an image of the projection remaining after removal of image information.

Step h:

When the removing instruction and the instruction of the designated area are received from the robot instruction analyzing and executing section 15, the image processing CPU 11 removes image information within a circular area of the designated area (refer to FIGS. 6 and 7). It is to be noted that such removing operation of the image information is performed by writing the data value "0" for picture elements included in the area to be removed.

Step i:

In the robot program, a statement that a moment calculation with respect to the center provided by the position of the center of the original "blank circle" is described subsequently, and consequently, the robot instruction analyzing and executing section 15 delivers a moment calculation instruction to the image processing CPU 11.

Step j:

The image processing CPU 11 thus executes a moment calculation in accordance with the instruction from the robot instruction analyzing and executing section 15. A suitable known technique may be used also for the algorithm for such moment calculation. Since the distance between the projection 6b and the center of the original "blank circle" is great, an image 18 (FIG. 7) of the ring 6 from which the ring portion 6a is removed is high in moment value, and accordingly, the accuracy is enhanced. Accordingly, for an image wherein a feature point to be extracted is the center of gravity, it is most effective and simple to adopt a "circle" as a profile of an area to be removed as in the present embodiment.

Figure 3:
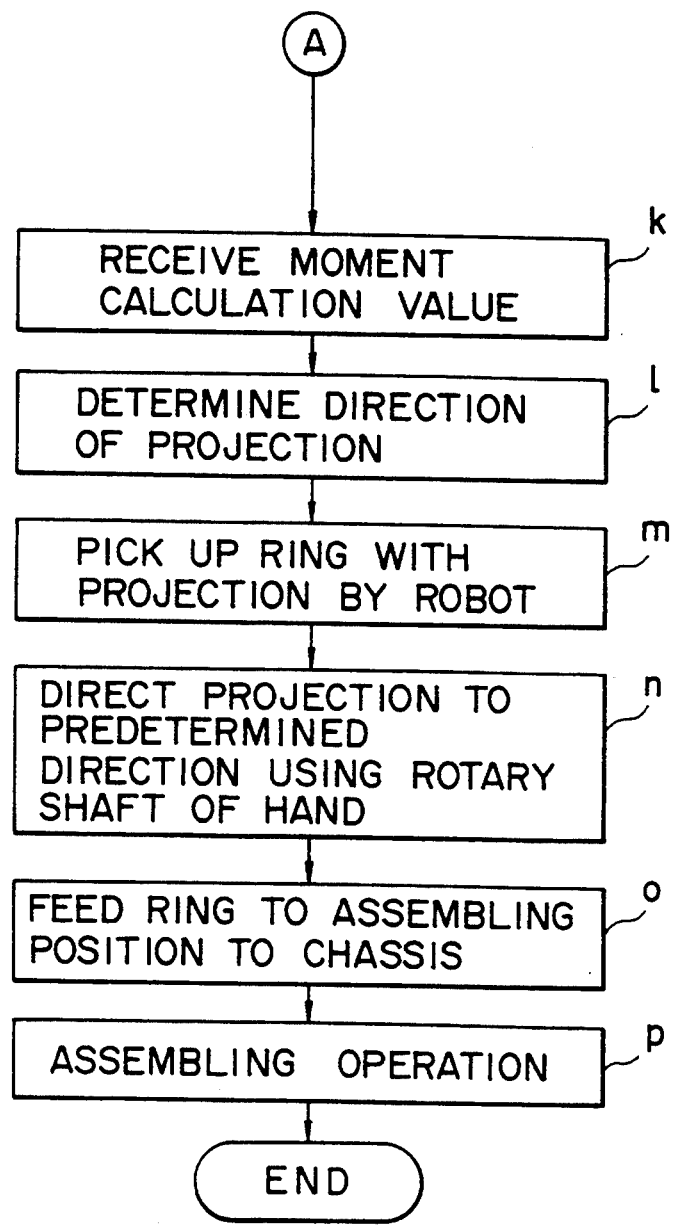

Step k:

Referring now to FIG. 3, the robot instruction analyzing and executing section 15 subsequently receives the moment value obtained at step j above from the image processing apparatus 1.

Step l:

The robot instruction analyzing and executing section 15 then determines, in accordance with the moment value thus received, a locus of the robot 2 to grasp the ring 6. Such determination of a locus merely involves determination of an operation to move the center of an operating end (hand) of the robot 2 to the detected position of the center of the "blank circle" and make the grasping angle of the robot hand so that the detected direction of the projection 6b may have a fixed angular relationship to a rotary shaft of the robot hand.

Consequently, the angle θ defined between the robot hand 19 grasping the ring 6 and the projection 6b of the ring 6 with respect to the center of the "blank circle" is fixed.

Step m:

The robot 2 operates in accordance with the locus determined at step 1 above to grasp the ring 6 with a projection thereon.

Figure 8:
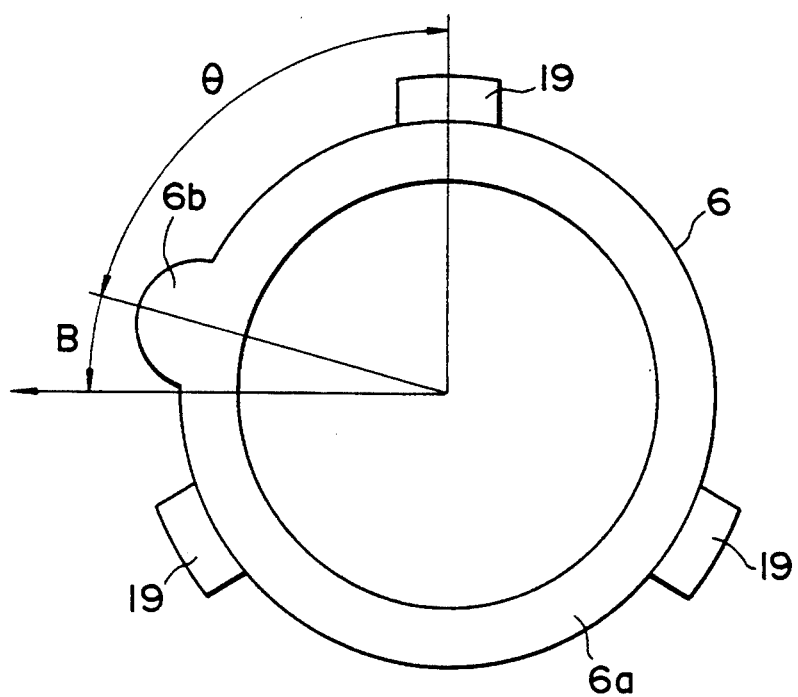
FIG. 8 is a diagrammatic representation showing a condition when a robot hand grasps the ring with a projection.

Step n:

The rotary shaft of the robot hand 19 is rotated so that the direction of the projection 6b of the ring 6 may always be a fixed direction as shown by an arrow mark B in FIG. 8.

Step o:

The ring 6 with a projection is carried to the location of a chassis 7 for a video tape recorder.

Step p:

The ring 6 with a projection is assembled to the chassis 7, thereby completing the series of assembling steps.

Figure 9:
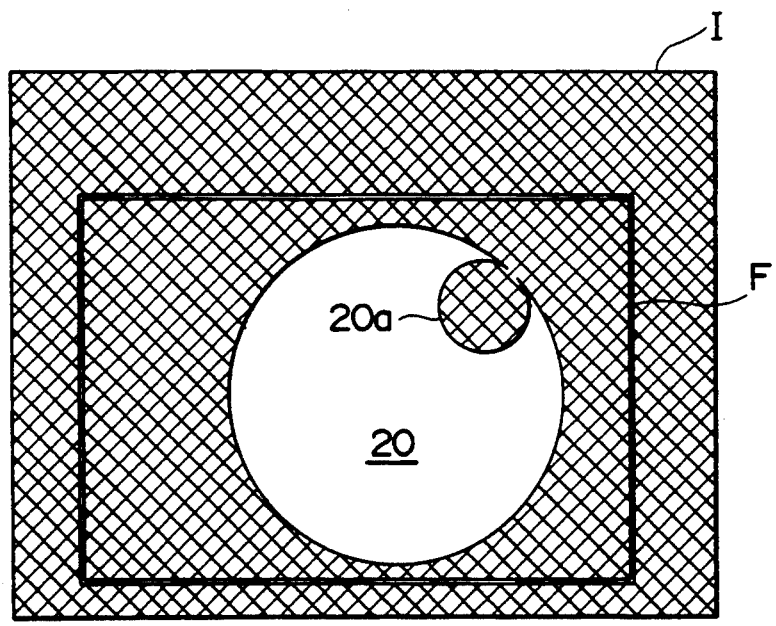
FIG. 9 is a schematic view showing an original image of a dial knob.
Figure 10:
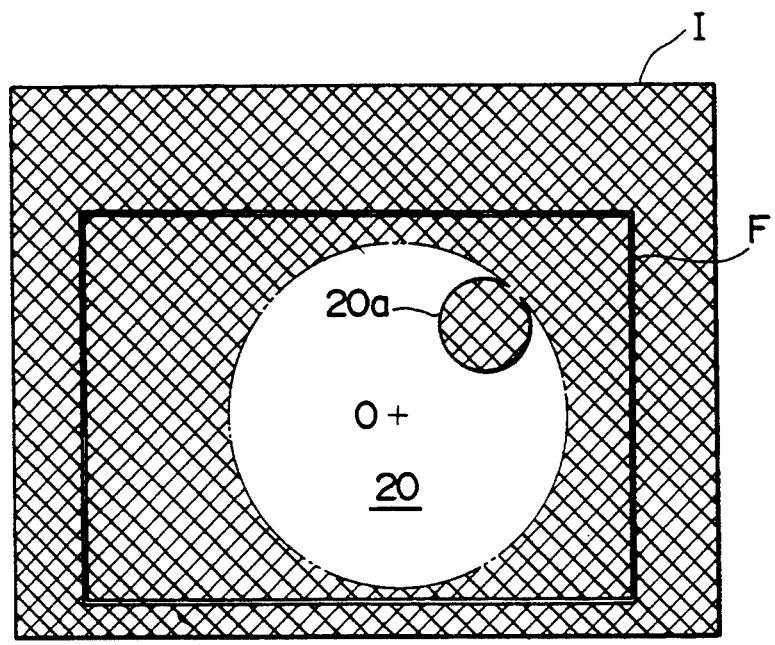
FIG. 10 is a similar view but illustrating designation of a removal range of the image information shown in FIG. 9.
Figure 11:
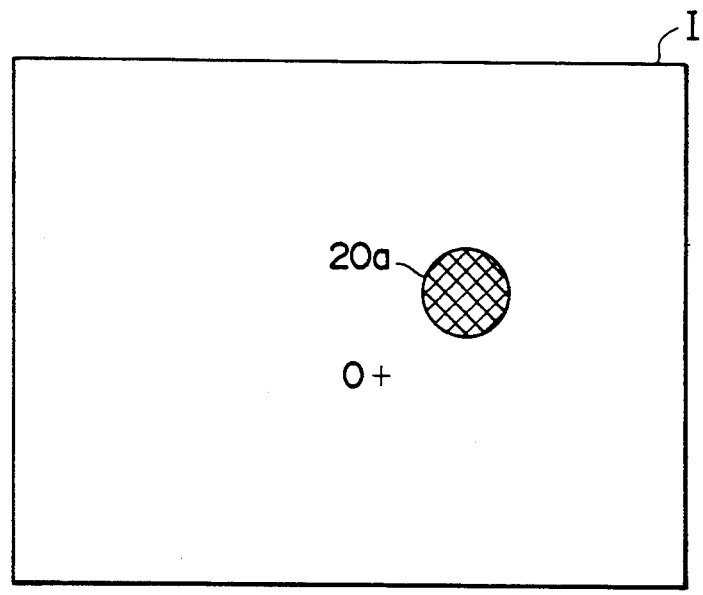
FIG. 11 is a schematic view showing an image of a cutaway portion of the dial knob remaining after removal of image information.

FIGS. 9 to 11 illustrate exemplary image processing when another part is handled as an object for operation. The technique according to the present invention is effective not only for recognition of a projection 6b as of a ring 6 with a projection but also for recognition of an object on which a cutaway portion is formed.

FIG. 9 shows an image when a dial knob 20 is photographed. In this instance, the background other than the part is detected as an area in which a part exists (indicated by cross hatching) due to illumination and/or a color of a pallet. In FIG. 9, a "blank circle" in a picture frame F indicates an image of the dial knob 20, and a small dark circle 20a inscribed in the "blank circle" indicates a cutaway portion formed in the dial knob 20.

In this instance, first the "blank circle" is detected and the center O thereof is detected, and then an area to be removed is set to the outside of the "blank circle", that is, the outside of a circle indicated by an alternate long and two short dashes line in FIG. 10, whereafter the area is removed. Consequently, an image from which a moment can be detected readily, that is, an image consisting only of the small circuit 20a as shown in FIG. 11, is obtained.

In this manner, it is sometimes useful to make it possible to remove image information not only for the inside of a designated circle but also for the outside of the designated circle.

Figure 12:
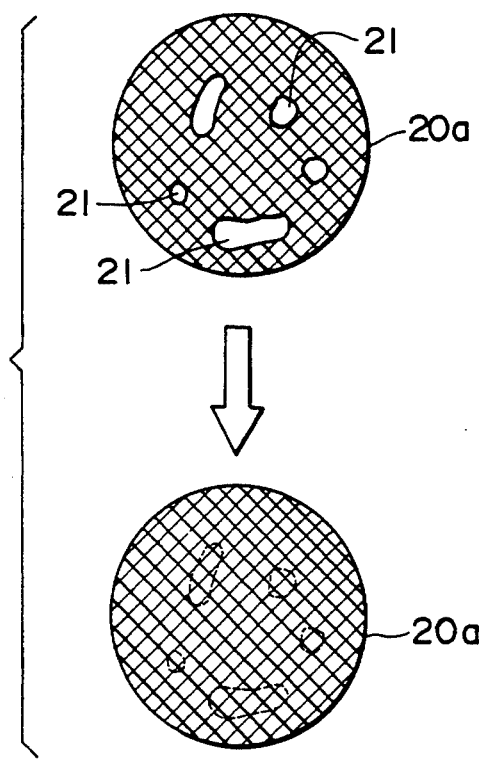
FIG. 12 is a schematic view illustrating painting out of noise dots scattered in an image indicating the cutaway portion of the dial knob.

Further, it sometimes occurs that white dots 21 arising from noise are scattered in a small circle 20a as shown in FIG. 12 and are preferably painted out positively so that the part may exist at the white noise dots appearing on the image in order to prevent the white dots 21 from having a bad influence on the moment calculation. Therefore, preferably not only a removing process but also a complementing process by painting out can be performed.

Figure 13:
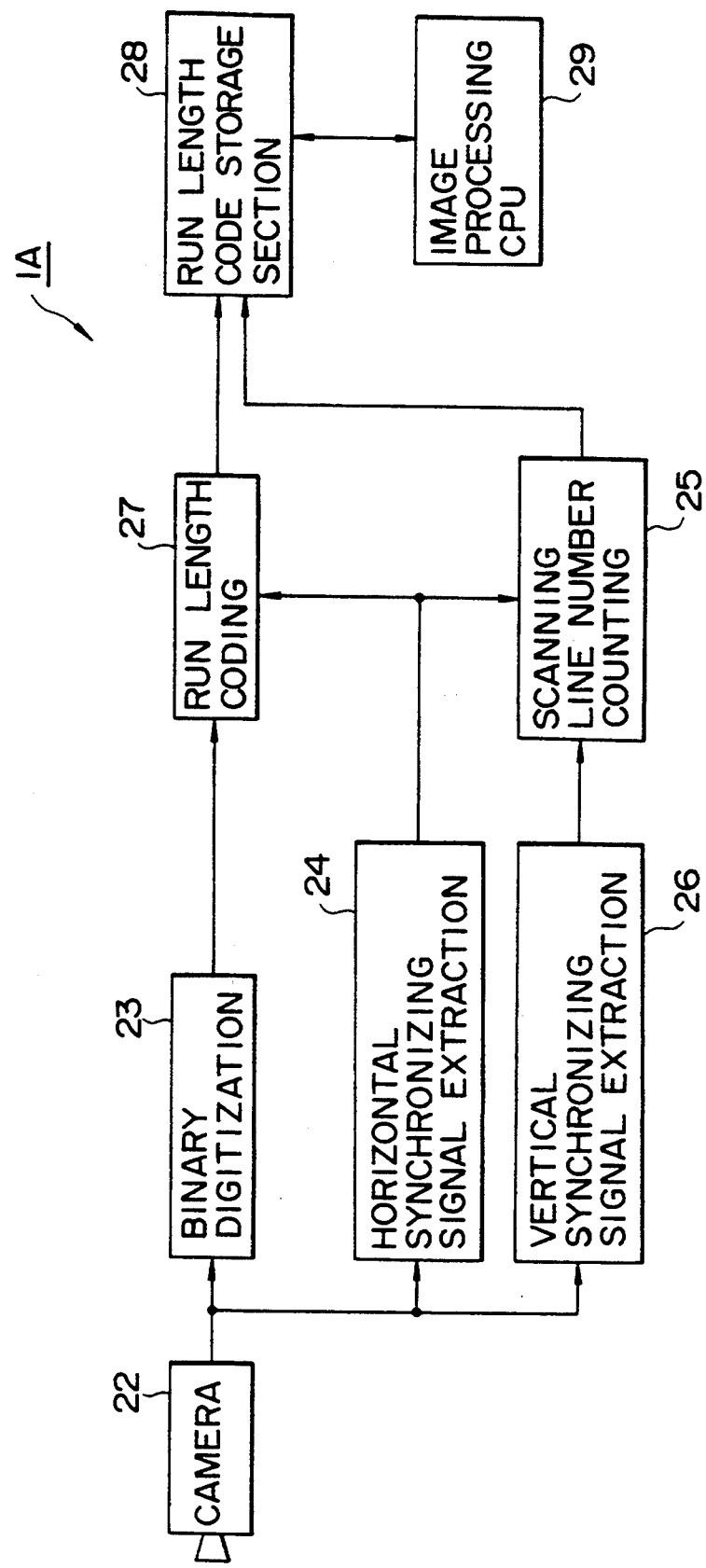
FIG. 13 is a block diagram of hardware construction of another image processing apparatus showing a second preferred embodiment of the present invention.

FIG. 13 shows an image processing apparatus 1A according to a second preferred embodiment of the present invention. The present image processing apparatus 1A is generally constructed so that image information is not stored as it is into a memory but, in order to save the memory capacity, run length coding is executed for image information and data after such coding are stored into a memory.

Figure 14A:
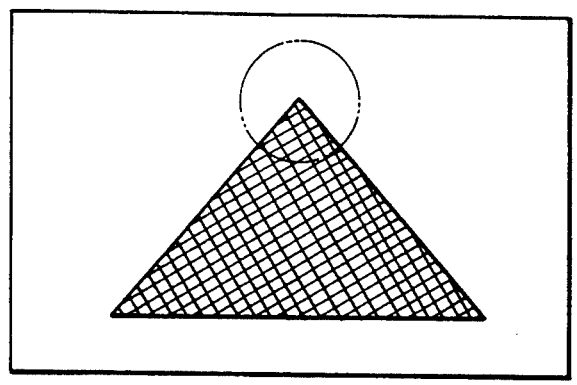
FIGS. 14(a) and 14(b) are schematic views illustrating a concept of run length coding.
Figure 14B:
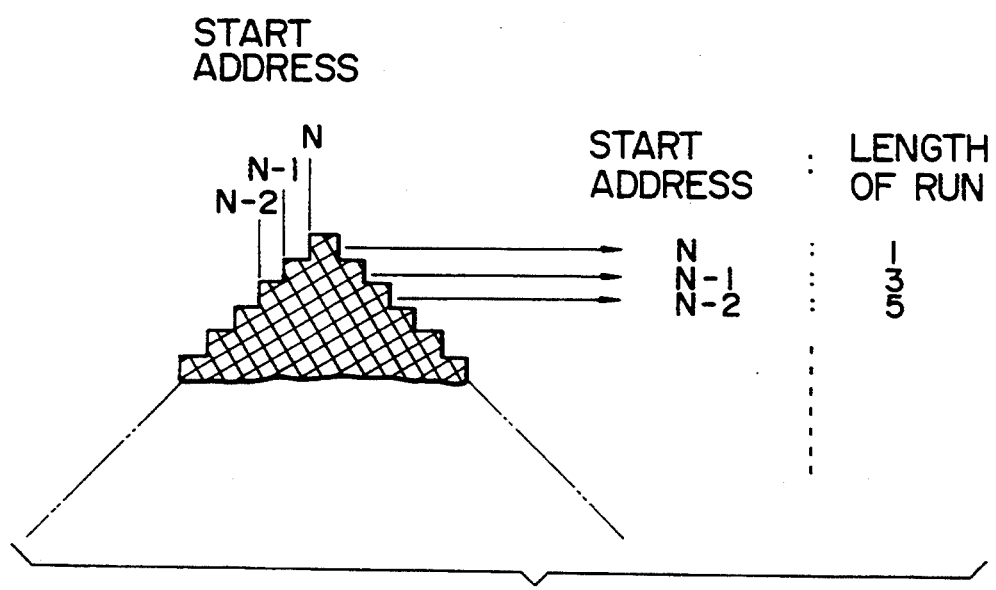

FIGS. 14(a) and 14(b) illustrate a concept of run length coding, and wherein that portion of a triangular image shown in FIG. 14(a) which is circumscribed in a circle of an alternate long and short dashes line is shown on an enlarged scale in FIG. 14(b). Run length coding is a method of extracting a starting position (address) of picture elements of an image of an object on a scanning line and a number of the picture elements as data.

Referring back to FIG. 13, hardware construction of the image processing apparatus 1A is shown. The image processing apparatus 1A is coupled to a controlling section of a robot as in the image processing apparatus 1 of the preceding embodiment. Since the relationship between the controlling section for the robot and the image processing section is similar to that described hereinabove, description regarding the robot control will be omitted herein.

While the image processing apparatus 1A needs less storage capacity and can achieve a reduction in the scale of the equipment since image information is not stored as it is into a memory as described above, it is disadvantageous in that predetermined processing is required when an image is to be displayed on a monitor.

Accordingly, when a personal computer is employed in order to realize an image processing apparatus, if monitoring is executed, making use of the image processing apparatus of the present embodiment, by software processing which operates on the personal computer, then an image processing apparatus can be obtained which eliminates the disadvantage described above and is small in scale of hardware to be added but functions adequately.

A camera 22 is provided to photograph an object for recognition similarly to the camera 4 described hereinabove. A binary digitizing section 23 receives an image signal from the camera 22 and operates in accordance with a predetermined algorithm to execute extraction and coding of image information of an effective image (an effective image portion except a synchronizing signal, equaling pulses and controlling signals such as a color synchronizing signal).

A horizontal synchronizing signal extracting section 24 extracts a horizontal synchronizing signal from an image signal and sends the thus extracted horizontal synchronizing signal to a scanning line number counting section 25, which counts such horizontal synchronizing signal, and also to a run length coding section 27 as a timing signal.

A vertical synchronizing signal extracting section 26 extracts a vertical synchronizing signal from an image signal from the camera 22, detects a first end position of a field and delivers a reset signal to the scanning line number counting section 25.

The run length coding section 27 is positioned at the next stage to the binary digitizing section 23. The run length coding section 27 counts a number of picture elements of that portion of a binary digitized image from the binary digitizing section 27 in which black picture elements appear successively, and codes the picture element number together with a first end address of the black picture elements in accordance with a predetermined format. The format is of any type that can be handled readily by the image processing CPU.

The scanning line number counting section 25 is a counter which resets its count value in response to a reset signal from the vertical synchronizing signal extracting section 26 and then counts up or increments its count value by one in response to each horizontal synchronizing pulse outputted from the horizontal synchronizing signal extracting section 24. The count value of the counter thus represents to which horizontal scanning line a signal currently being obtained from the camera 22 belongs (such information will be hereinafter referred to as "scanning line information").

A run length code storage section 28 stores therein a data value obtained from the run length coding section 27 together with scanning line information from the scanning line number counting section 25. It is to be noted that such scanning line information need not be stored as data, but a storage area of the run length code storage section 28 may be divided in advance into a predetermined number of areas which are individually allotted as regions for individual scanning line numbers.

An image processing CPU 29 is provided to execute run length accessing to the run length code storage section 28 and execute predetermined recognizing and measuring processes in accordance with run length code information stored in the run length code storage section 28.

Information obtained by run length coding represents a "length of a run" connected in a horizontal direction as described hereinabove. Accordingly, a removing process for an image can be performed by simple numerical processing.

FIG. 15 conceptively illustrates software processing for removal for an image. Here, "run information" represents a "run" which is defined by a "first end position of a run" and a value of a "length of a run" recalled from the run length code storage section 28, and "removal information" represents information of an area to be removed in a horizontal scanning line.

Five different relations are available between run information and removal information as seen from FIG. 15, and the following processes are executed for them.

(1) When the length of a "run" L1 is greater than the length of "removal information" E1 and the "run" L1 includes the "removal information" therein, a "run" M1 as a result of the processing includes two runs including a "run" MF1 which includes the first end of the original "run" L1 and includes the first end of the removal area as the last end thereof and another "run" MR1 which includes the last end of the removal area as the first end thereof and includes the last end of the original "run" L1 as the last end thereof.

(2) When the length of a "run" L2 is shorter than the length of "removal information" E2 and the "removal information" E2 includes the "run" L2 therein, the "run" L2 is all removed as there is none left.

(3) When there is no overlapping portion between a "run" L3 and a removal area of "removal information" E3, nothing is performed. In other words, the "run" L3 remains as it is.

(4) When a certain range from the first end of a "run" is outside a removal area of "removal information" E4 and a portion of the "run" L4 adjacent the last end is within the removal area, the original "run" L4 is reduced to a "run" M4 which begins with the first end of the original "run" L4 and ends with the first end of the removal area (such reduction will be hereinafter referred to as "first reduction").

(5) When the first end of a "run" L5 is within a removal area of "removal information" E5 and a portion of the "run" L5 adjacent the last end is outside the removal area, the original "run" L5 is reduced to a run M5 which includes the last end of the removal area as the first end thereof and includes the last end of the original run "L5" as the last end thereof (such reduction will be hereinafter referred to as "second reduction").

It is to be noted that detailed processing regarding run length coding is performed in the following manner by the run length information storage section 28. FIG. 16 illustrate concepts of memory images of the processes described below. In particular, the section (i) of FIG. 16 illustrates a process of the division described in paragraph (1) above in connection with FIG. 15; the section (ii) illustrates a process of the removal described in paragraph (2) of FIG. 15; the section (iii) illustrates a process of the first reduction described in paragraph (4) of FIG. 15; and the section (iv) illustrates a process of the second reduction described in paragraph (5) of FIG. 15.

(i) The "division" involves reduction of information only of a "length of a run" from the original "run information", and adopts, as "run information", information which includes the first end of an original "run" and includes the first end of a removal area as the last end thereof and adds, to the "run information", information which includes the last end of the removal area as the first end thereof and includes the last end of the original "run" as the last end thereof.

In particular, of the "run information" of the divided first "run" MF1, the first end position is equal to the first end position of the "run" L1 before division and the run length is equal to the length from the first end position of the "run" L1 to the first end position of the "removal information" E1, and of the "run information" of the latter "run" MR1, the first end position is equal to a position next to the last end position of the "removal information" E1 and the run length is equal to the length from such position to the last end position of the original "run" L1.

(ii) As regards the "removal", the original "run information" is merely deleted from the memory.

(iii) For the process of the "first reduction", only "run length" information of the original "run information" is changed. In particular, the length of the run is changed to a value equal to a length from the first end position of the "run" L4 to the first end position of the "removal information" E4.

(iv) For the process of the "second reduction", all of information of the original "run", in short, both of the first end position and the length of the run, are changed. In particular, the first end position of the "run" is changed to a position next to the last end position of the "removal information"E5, and the length of the run is changed to a length from such position to the last end position of the original "run" L5.

It is to be noted that the complementing process in run length coding corresponding to painting out described hereinabove with reference to FIG. 12 may be performed by connecting "runs" within a predetermined range of "run information", in short, by changing the length of the run. This will be understood readily from the fact that information which must originally be obtained as a single block of "run information" is divided into a plurality of blocks of "run information" by noise of the like, which causes a drop of information.

Figure 17:
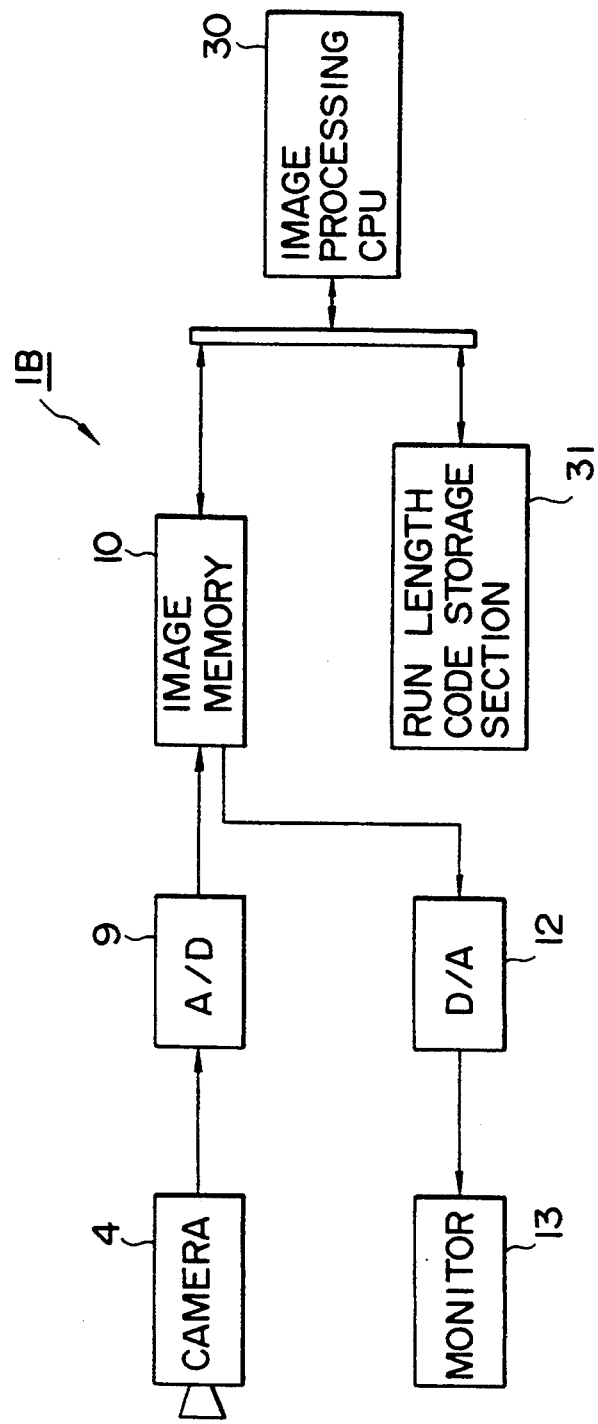
FIG. 17 is a block diagram of hardware construction of a further image processing apparatus showing a third preferred embodiment of the present invention.
Figure 18:
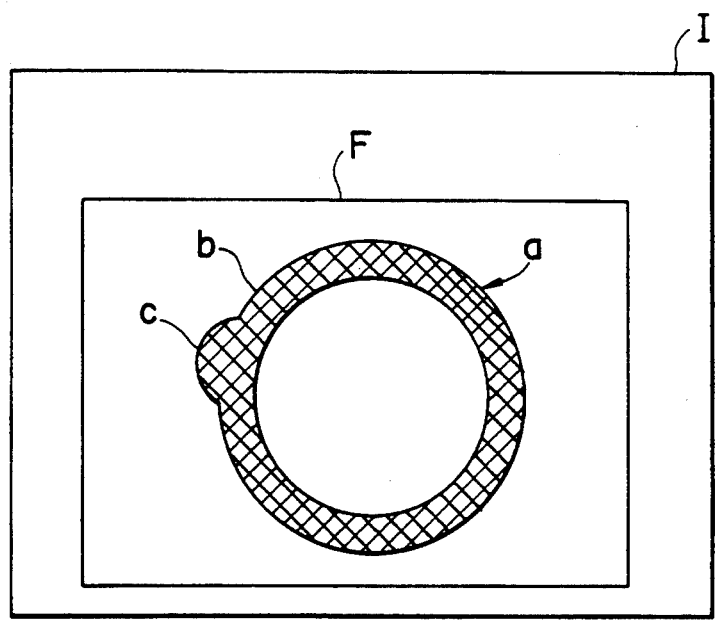
FIG. 18 is a schematic view showing an exemplary image which cannot be recognized readily by a conventional image processing method.
Figure 19:
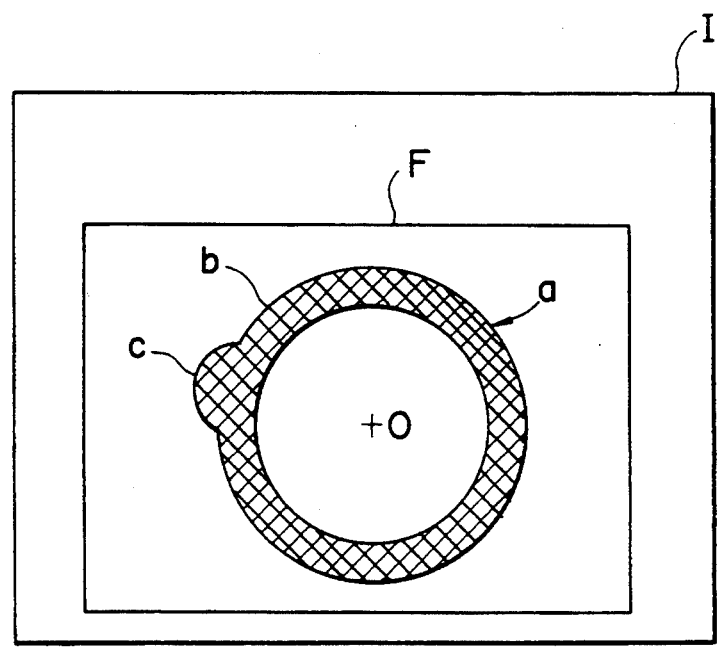
FIG. 19 is a similar view but illustrating detection of the center of gravity of the image of FIG. 18 by the conventional image processing method.
Figure 20:
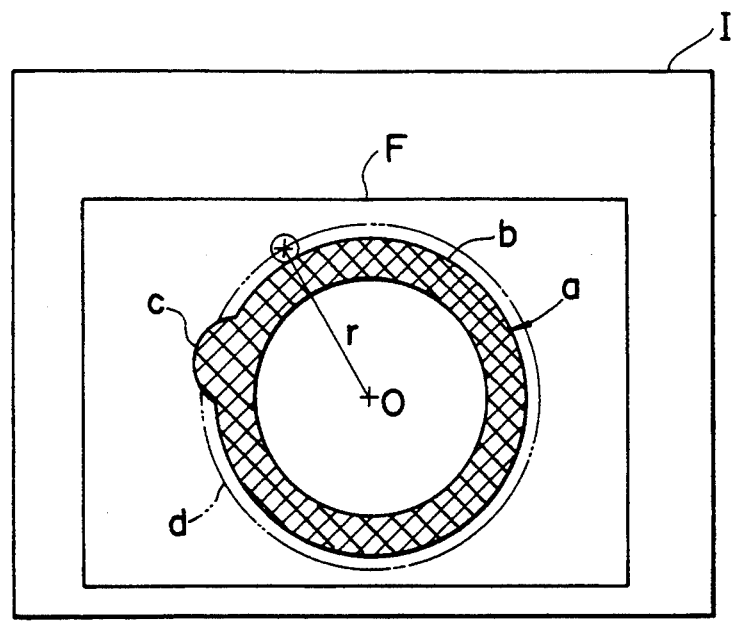
FIG. 20 is a similar view but illustrating determination of a radius of a trace circle for the image of FIG. 18 by the conventional image processing method.
Figure 21:
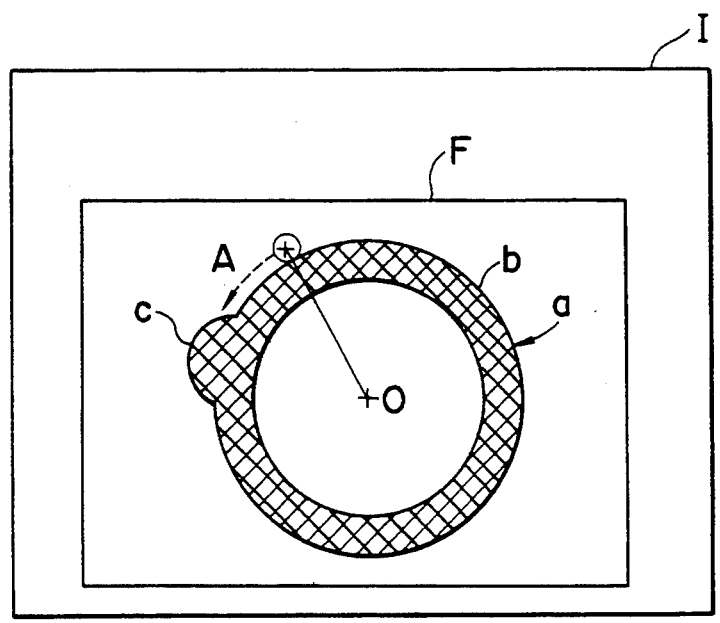
FIG. 21 is a similar view but illustrating recognition of a projection of the image of FIG. 18 by tracing by the conventional image processing method.
Figure 22:
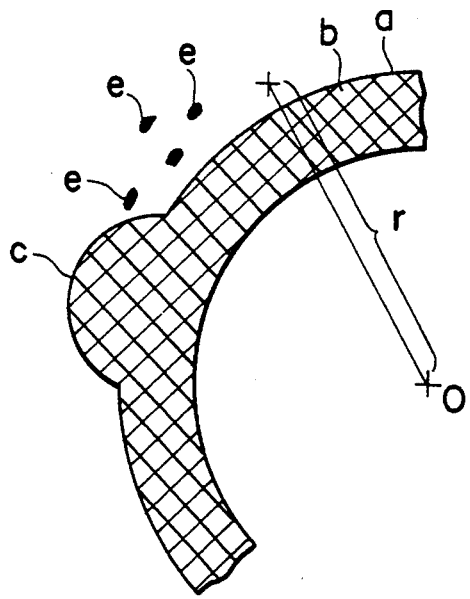
FIG. 22 is a schematic view illustrating a problem of the conventional image processing method.
Figure 23:
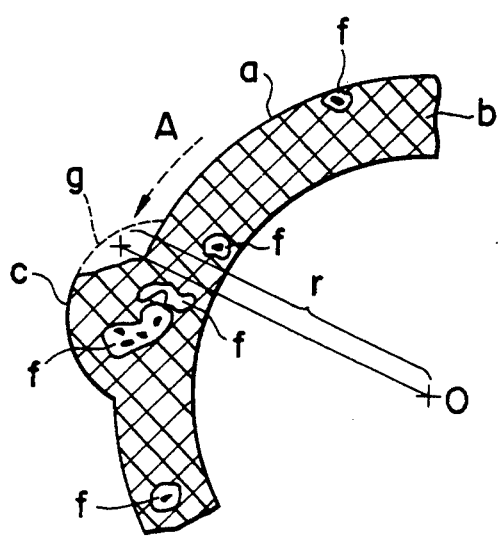
FIG. 23 is a similar view but illustrating another problem of the conventional image processing method.
Figure 25A:
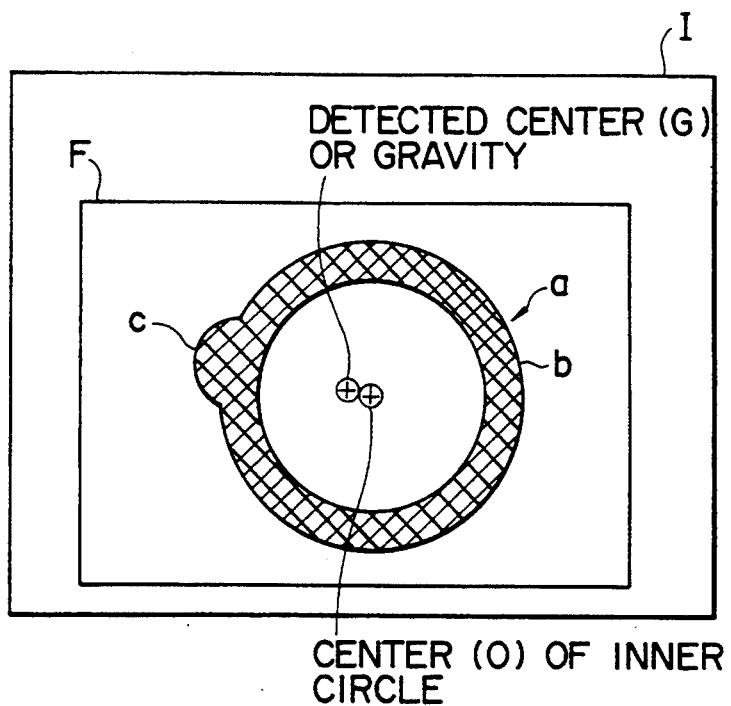
FIGS. 25(a) an 25(b) are a schematic view and a diagrammatic view, respectively, illustrating a displacement in position of the center of gravity by the conventional image processing method.
Figure 25B:
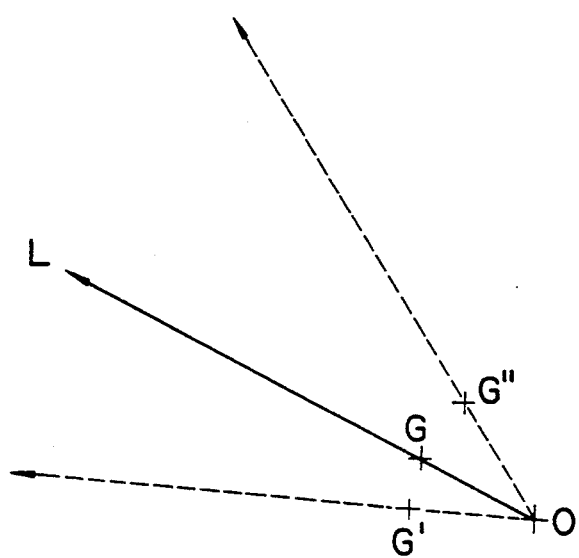

FIG. 17 shows hardware construction of an image processing apparatus 1B according to a third preferred embodiment of the present invention. The image processing apparatus 1B has both of the characteristics of the image processing apparatus 1 and 1A of the first and second embodiments described hereinabove.

The image processing apparatus 1B includes a camera 4, an A/D converter 9, an image memory 10, a D/A converter 12 and a monitor 13 which are all similar to those of the image processing apparatus 1 of the first embodiment. Further, the image processing apparatus 1B operates in a similar manner to the image processing apparatus 1A of the second embodiment except only that run length coding is executed by software processing of an image processing CPU 30 without relying upon hardware.

In particular, image information from the camera 4 is digitized by the A/D converter 9 and stored once into the image memory 10, whereafter run length coding thereof is executed by the image processing CPU 30 and "run information" thus obtained is stored into the run length code storage section 31. Then, a removing process or a complementing process for the image is performed as a process of "run information" similarly as in the image processing apparatus 1A of the second embodiment described hereinabove.

The image processing apparatus 1B is advantageous in that a programmer can make a robot program while referring to an image transmitted from the image memory 10 by way of the D/A converter 12 to and displayed on the monitor 13 and besides the utilizing efficiency of the memory when a plurality of images are stored is high.

Having now fully described the invention, it will be apparent to one of ordinary skill in the art that many changes and modifications can be made thereto without departing from the spirit and scope of the invention as set forth herein.

What is claimed is:

1. An image processing apparatus for imaging an object with an irregularly shaped area to be grasped by an operating end of a robot arm, comprising:

imaging means for producing image data of an image of the object for processing;

processing means receiving and storing the image data from the imaging means for determining a center of gravity of the object based upon the image data and including means for removing from the image data image information stored in said processing means;

means for delivering to said processing means a removing instruction specifying a position, a dimension and a profile of a predetermined area of said image information stored in said processing means for causing said processing means to remove from said image data received from said imaging means those data which correspond to said predetermined area at said position; and moment value and path calculation means for calculating a moment value between said center of gravity and said irregularly shaped area and for calculating a path for movement of the robot arm based upon said moment value, whereby a center of the operating end of the robot arm substantially coincides with said position and said irregularly shaped area exhibits a predetermined angular relationship with said operating end of the robot arm.

2. An image processing apparatus for imaging an object with an irregularly shaped area to be grasped by an operating end of a robot arm, comprising:

imaging means for producing image data of an image of the object for processing;

imaging paint means operable in response to an instruction specifying a position, a dimension and a profile of a predetermined area of said image for painting into said image data received from said imaging means data which corresponds to said predetermined area at said position and producing corrected image data;

processing means for processing the corrected image data received from said image paint means to calculate a feature point describing said object;

means for delivering to said processing means a removing instruction for causing said processing means to use the feature point to remove predetermined image data stored in said processing means from said corrected image data; and moment value and path calculation means for calculating a moment value between said feature point and said irregularly shaped area and for calculating a path for movement of the robot arm based upon said moment value, whereby a center of the operating end of the robot arm substantially coincides with said feature point and said irregularly shaped area exhibits a predetermined angular relationship with said operating end of the robot arm.

3. An image processing apparatus for imaging an object with an irregularly shaped area to be grasped by an operating end of a robot arm, comprising:

imaging means for producing image data of an image of the object for processing;

memory means receiving the image data from the imaging means for storing therein said image data of the object;

processing means for processing data received from said memory means to calculate a feature point describing said object, said processing means including means for removing a predetermined area stored therein from the image data at the calculated feature point upon receipt of a removing instruction;

means for providing the removing instruction to said processing means; and moment value and path calculation means for calculating a moment value between said feature point and said irregularly shaped area and for calculating a path for movement of the robot arm based upon said moment value, whereby a center of the operating end of the robot arm substantially coincides with said feature point and said irregularly shaped area exhibits a predetermined angular relationship with said operating end of the robot arm.

4. An image processing apparatus for imaging an object with an irregularly shaped area to be grasped by an operating end of a robot arm, comprising:

imaging means for producing image data of an image of said object for processing;

memory means receiving the image data from the imaging means for storing therein said image data of the object;

image paint means operable in response to an instruction specifying a position, a dimension and a profile of a predetermined area of said image, for painting correction data into said image data stored at a portion of said memory means which corresponds to said predetermined area at said position, so that said image data of said object becomes complete image data;

processing means for processing the complete image data received from said image paint means to calculate a feature point describing said object;

means for delivering to said processing means a removing instruction for causing said processing means to remove predetermined image data stored in said processing means from said complete image data at said feature point; and moment value and path calculation means for calculating a moment value between said feature point and said irregularly shaped area and for calculating a path for movement of the robot arm based upon said moment value, whereby a center of the operating end of the robot arm substantially coincides with said feature point and said irregularly shaped area exhibits a predetermined angular relationship with said Operating end of the robot arm.

5. An image processing apparatus for imaging an object with an irregularly shaped area to be grasped by an operating end of a robot arm, comprising:

imaging means for producing image data of an image of the object for processing;

binary digitizing means receiving the image data of the object from the imaging means for binary digitizing said image data of the object for processing;

run length coding means receiving the image data from the binary digitizing means for run length coding said image data;

run length code storage means receiving the run length coded image data from the run length coding means for storing therein the run length codes;

image processing means for determining a center of gravity of the object and being operable in response to a removal instruction specifying a predetermined area of said image for removing or reducing run length codes from said run length code storage means which correspond to a predetermined area positioned at the determined center of gravity, so that only run length codes which are outside the predetermined area remain;

instruction means for providing said removal instruction to said image processing means; and moment value and path calculation means for calculating a moment value between said center of gravity and said irregularly shaped area and for calculating a path for movement of the robot arm based upon said moment value, whereby a center of the operating end of the robot arm substantially coincides with said center of gravity and said irregularly shaped area exhibits a predetermined angular relationship with said operating end of the robot arm.

6. An image processing apparatus for imaging an object with an irregularly shaped area to be grasped by an operating end of a robot arm, comprising:

imaging means for producing image data of an image of the object for processing;

binary digitizing means receiving the image data from the imaging means for binary digitizing said image data of the object for processing;

run length coding means receiving the image data from the binary digitizing means for run length coding the image data;

run length code storage means receiving the run length coded image data from the run length coding means for storing therein run length codes;

image paint means operable in response to an instruction specifying a position, a dimension and a profile of a predetermined area of said image for painting stored run length codes by lengthening a run length of the stored codes, the lengthened run length codes being stored in said run length code storage means;

processing means for processing data received from said run length code storage means to remove predetermined information describing said object stored in said run length code storage means; and moment value and path calculation means for calculating a moment value between said position and said irregularly shaped area and for calculating a path for movement of the robot arm based upon said moment value, whereby a center of the operating end of the robot arm substantially coincides with said position and said irregularly shaped area exhibits a predetermined angular relationship with said operating end of the robot arm.

* * * * *

UNITED STATES PATENT AND TRADEMARK OFFICE
CERTIFICATE OF CORRECTION

PATENT NO. : 5,452,370
DATED : September 19, 1995
INVENTOR(S) : Yasayuki NAGATA

It is certified that error appears in the above-indentified patent and that said Letters Patent is hereby corrected as shown below:

Col. 5, line 65, after ")" insert —,—
Col. 7, line 13, after "robot" insert —,—
     line 14, after "calculation" insert —,—
     line 29, after "receives" insert —,—
     line 35, after "that" insert —,—
     line 66, after "10" insert —,—
Col., 13, line 21, change ""E5" to —" E5—
     line 33, change "of" first occurence, to —or—

Col. 15, line 54, change "Operating" to —operating—

Signed and Sealed this

Seventeenth Day of December, 1996

Attest:

BRUCE LEHMAN

*Attesting Officer*     *Commissioner of Patents and Trademarks*